(12) United States Patent
Lienhard et al.

(10) Patent No.: US 11,473,411 B2
(45) Date of Patent: Oct. 18, 2022

(54) WATER TREATMENT FOR INCREASING RECOVERY OF A RESOURCE FROM A RESERVOIR

(71) Applicant: Massachusetts Institute of Technology, Cambridge, MA (US)

(72) Inventors: John H. Lienhard, Lexington, MA (US); Kishor Govind Nayar, Houston, TX (US)

(73) Assignee: Massachusetts Institute of Technology, Cambridge, MA (US)

( * ) Notice: Subject to any disclaimer, the term of this patent is extended or adjusted under 35 U.S.C. 154(b) by 405 days.

(21) Appl. No.: 16/735,927

(22) Filed: Jan. 7, 2020

(65) Prior Publication Data

US 2020/0217185 A1    Jul. 9, 2020

Related U.S. Application Data

(60) Provisional application No. 62/789,012, filed on Jan. 7, 2019.

(51) Int. Cl.
     *C02F 1/469*      (2006.01)
     *E21B 43/20*      (2006.01)
     (Continued)

(52) U.S. Cl.
     CPC .............. *E21B 43/20* (2013.01); *C02F 1/441* (2013.01); *C02F 1/4693* (2013.01); *C09K 8/584* (2013.01);
     (Continued)

(58) Field of Classification Search
     CPC .............. C09K 8/584; C02F 2001/427; C02F 2103/08; C02F 1/00; C02F 1/44;
     (Continued)

(56) References Cited

U.S. PATENT DOCUMENTS

| 2018/0148633 A1 | 5/2018 | Ayirala |
| 2019/0062189 A1 | 2/2019 | Lienhard |

FOREIGN PATENT DOCUMENTS

| WO | 2018076115 A1 | 5/2018 |

OTHER PUBLICATIONS

R. R. Nair, et al., "Smart Water for Enhanced Oil Recovery by Nano-Filtration," 7 J Pet. Environ. Biotechnol. 1000273 (2016).
(Continued)

*Primary Examiner* — Brian A McCaig
(74) *Attorney, Agent, or Firm* — Modern Times Legal; Robert J. Sayre

(57) ABSTRACT

A first stream of an aqueous solution flows through an upstream desalination or nanofiltration system. A second stream of the aqueous solution is mixed with the diluate output from the upstream desalination system or with the diluate or concentrate output from the upstream nanofiltration system with a flow ratio of the second stream of the aqueous solution to the feed stream of <0.47 or >0.63. A liquid composition flows into the concentrate channels of an electrically driven separation apparatus, while the feed stream flows into at least the diluate channels at a ratio of 0.3 to 0.81 to the flow of the liquid composition. An applied voltage selectively draws monovalent ions from the feed stream in the diluate channels through the monovalent-selective ion exchange membranes into the concentrate channels to produce a treated diluate having a sodium chloride ratio (SCR)<0.7.

17 Claims, 6 Drawing Sheets

(51) Int. Cl.
  *C09K 8/584* (2006.01)
  *C02F 1/44* (2006.01)
  *C02F 103/08* (2006.01)
  *C02F 1/42* (2006.01)

(52) U.S. Cl.
  CPC .... *C02F 2001/427* (2013.01); *C02F 2103/08* (2013.01); *Y02A 20/124* (2018.01); *Y02A 20/131* (2018.01)

(58) Field of Classification Search
  CPC .. C02F 1/441; C02F 1/442; C02F 1/46; C02F 1/469; C02F 1/4693; E21B 43/16; E21B 43/20; E21B 43/34; Y02A 20/124; Y02A 20/131
  See application file for complete search history.

(56) References Cited

OTHER PUBLICATIONS

S. J. Fathi, et al., "Water-Based Enhanced Oil Recovery (EOR) by 'Smart Water': Optimal Ionic Composition for EOR in Carbonates," 25 Energy Fuels 5173-5179 (2011).

K. G. Nayar and J. H Lienhard, V, "Brackish Water Desalination for Greenhouse Agriculture: Comparing the Costs of RO, CCRO, EDR, and Monovalent-Selective EDR," 475 Desalination 114188 (pre-print) (Nov. 8, 2019).

USPTO, International Search Report and Written Opinion for PCT/US20/12513 (corresponding PCT application) (dated Apr. 1, 2020).

WATER TREATMENT FOR INCREASING RECOVERY OF A RESOURCE FROM A RESERVOIR

RELATED APPLICATION

This application claims the benefit of U.S. Provisional Application No. 62/789,012, filed 7 Jan. 2019, the entire content of which is incorporated herein by reference.

BACKGROUND

The discussion of the background state of the art, discussed below, may reflect hindsight gained from the disclosed invention(s); and these characterizations are not necessarily admitted to be prior art.

Only around 10% of the oil from a typical hydrocarbon reservoir is recoverable without injecting water or gas in a reservoir; and around 60% of world's oil reservoirs are from "carbonate formations" (i.e., rocks which have a high amount of carbonate in them, calcium and magnesium carbonate). Recently, it was shown by S. J. Fathi, et al., "Water-Based Enhanced Oil Recovery (EOR) by 'Smart Water': Optimal Ionic Composition for EOR in Carbonates," 25 Energy & Fuels. 5173-5179 (2011), that injecting "monovalent-free" seawater (i.e., seawater with no more than a small concentration of sodium chloride) can increase the recovery of oil from carbonate reservoirs. Fathi, et al., experimentally injected seawater with varying degrees of sodium chloride presence and showed that, for chalk core from a carbonate reservoir, as the proportion of sodium chloride in seawater was reduced from 0.8 to 0.3, with the total dissolved salts reducing from 35 g/kg to 10 g/kg, overall oil recovery increased by around 10%. Prior literature on the process had theorized that reducing monovalent ions in injection water for carbonate reservoirs increased the wettability of oil in a reservoir allowing the oil to be more easily released and extracted.

Removing only monovalent ions (i.e., sodium chloride) from seawater, however, is not easy. R. Nair, et al., "Smart Water for Enhanced Oil Recovery by Nano-Filtration," 7 J. Pet. Environ. Biotechnol. 1000273 (2016), had proposed using a combination of reverse osmosis (RO) and nanofiltration (NF) to reduce sodium chloride in filtered seawater 12 for use in oil and gas applications (see FIG. 1), where the seawater 12 has the following dissolved-salt concentrations: sodium ($Na^+$): 10,800 parts per million (ppm); chlorine ($Cl^-$): 19,500 ppm; calcium ($Ca^{2+}$): 500 ppm; magnesium ($Mg^{2+}$): 1,200 pm; sulfate ($SO_4^{2-}$): 2,500 ppm; and a total dissolved salts (TDS) concentration of 34,400 ppm. The seawater 12 is fed in parallel to a nanofiltration system 14 and reverse-osmosis system 16, with the permeate 18 of the nanofiltration system 18 being mixed with the seawater 12 fed to reverse-osmosis system 16, which produces a brine 24, which is rejected, and a permeate 22 with a TDS less than 500 ppm. The retentate 20 from the nanofiltration system 14 [having the following dissolved salt concentrations: sodium ($Na^+$): 9,300 ppm; chlorine ($Cl^-$): 16,700 ppm; calcium ($Ca^{2+}$): 350 ppm; magnesium ($Mg^{2+}$): 1,000 pm; sulfate ($SO_4^{2-}$): 2,400 ppm; and a total dissolved salts (TDS) concentration of 29,750 ppm] is combined with the permeate 22 of the RO system to produce "smart water" 25 with a TDS between 10,000 and 28,000 ppm. The cost of such a design is very high, however; and commercial membranes currently cannot deliver the selectivity needed.

Cost-effectively increasing the recovery of hydrocarbons from hydrocarbon reservoirs by tailoring the ion composition of injected water requires careful optimization of several water-treatment steps. Experimental studies are typically conducted on core samples of hydrocarbon reservoirs to determine optimal ion compositions of injection water that alter the "wettability" of hydrocarbons in a hydrocarbon reservoir sufficiently to enhance the amount of hydrocarbon extracted. However, other factors, such as preventing scale formation, enhancing the life of the reservoir, and minimizing water treatment and transportation costs, are also important. NF systems are typically used in oil and gas applications to remove sulfate ions from injected water to prevent the formation of hydrogen-sulfide gas and "souring" of oil wells. RO systems are used to dilute seawater or produced water to meet the salinity requirements of injection water. NF can also, to a lesser extent, separate monovalent and divalent ions in a feed stream creating two streams, one richer in monovalent ions and the other richer in non-monovalent ions. Electrically driven separation apparatus, such as electrodialysis systems equipped with monovalent selective membranes, can be used to more effectively increase or decrease the composition of monovalent ions in seawater. Electrodialysis systems with monovalent-selective membranes have been widely used for concentrating seawater for salt production. Recently, the present inventors in Nayar, et al., "Brackish water desalination for greenhouse agriculture: Comparing the costs of RO, CCRO, EDR, and monovalent-selective EDR," 475 Desalination. 114188 (2019) have also described the use of these electrodialysis systems for creating low-monovalent-ion-concentration brackish water for agricultural applications, as well.

It must be noted that the costs of RO, NF and electrically driven separation with these water treatment systems vary significantly with scale, and the increase in recovery delivered by each of these systems is different. To effectively and reliably increase the recovery of hydrocarbons from hydrocarbon reservoirs, a highly optimized composition of injection water is advantageous. To provide a highly optimized composition of injection water, an optimized process of hybridization of desalination, nanofiltration and electrically driven separation systems is disclosed.

SUMMARY

Methods and apparatus for treating source water (e.g., brackish water, sea water, and oil- and gas-produced water) are described herein, where various embodiments of the methods and apparatus may include some or all of the elements, features and steps described below.

The cost and technical effectiveness of recovery of hydrocarbons from a hydrocarbon reservoir can be enhanced using an upstream desalination system or nanofiltration system that has an outlet in fluid communication with an electrically driven separation apparatus. The electrically driven separation apparatus includes an anode, a cathode, and a plurality of anionic and cationic monovalent-selective ion exchange membranes alternating in a repeating sequence between the anode and the cathode. Alternating diluate channels and concentrate channels are defined in a repeating sequence between the cationic and anionic monovalent-selective ion exchange membranes.

A first stream of an aqueous solution comprising monovalent ions and multi-valent ions dissolved in water flows through the upstream desalination system or nanofiltration system. The upstream desalination system or nanofiltration system produces a concentrate output and a diluate output from the first stream of the aqueous solution; the concentrate output has a higher concentration of dissolved ions than does the diluate output. A second stream of the aqueous solution is mixed with the diluate output from the upstream desalination system or with the diluate or concentrate output from the upstream nanofiltration system to produce a feed stream such that the ratio of flow of the second stream of the aqueous solution to that of the feed stream is less than 0.47 or greater than 0.63. These ranges cover the optimal hybrid configurations between the nanofiltration or desalination systems and the electrically driven separation apparatus for a variety of treatment scenarios for various types of hydrocarbon reservoirs. Ratios greater than 0.63, when using concentrate output from an upstream nanofiltration system, are advantageous to cost effectively boost concentrations of calcium and magnesium in injection water for increasing oil recovery from carbonate reservoirs. Ratios less than 0.47, when using diluate output from a nanofiltration system, are advantageous for effectively reducing sulfate concentrations in injection water to reduce risks of producing hydrogen sulfide during hydrocarbon production. The choice of diluate output from a desalination or nanofiltration stream further allows tailoring water to the needs of sandstone-based reservoirs where desired injection water salinities are much lower than for carbonate reservoirs.

A liquid composition flows into inputs of the concentrate channels, while the feed stream flows into an input of at least the diluate channels while applying a voltage to the anode and to the cathode, wherein the feed stream flows into the diluate channels at a ratio of 0.3 to 81 to flow of the liquid composition flowing into the concentrate channels. Each membrane allows a different amount of water through, and the ratio depends on the extent of removal of monovalent ions, the prevailing discharge regulations, etc. In general, a ratio above 81 may be economically unfeasible, while a ratio less than 0.3 may not be technically viable. The applied voltage selectively draws the monovalent ions from the feed stream in the diluate channels through the monovalent-selective ion exchange membranes into the concentrate channels while blocking or substantially inhibiting transport of the multi-valent ions from the feed stream through the monovalent-selective ion exchange membranes into the concentrate channels, to produce a treated diluate stream at an output of the diluate channel having a sodium chloride ratio (SCR) less than 0.7. Finally, the treated diluate stream is injected into the hydrocarbon reservoir to extract hydrocarbons from the hydrocarbon reservoir.

The liquid composition that flows into the concentrate channels can either comprise a third steam of the aqueous solution or can have a composition distinct from the composition of the aqueous solution. In particular applications, the liquid composition flowing into the concentrate channels comprises produced water from oil extraction.

In some cases, a surfactant and/or a salt is added to the treated diluate output to change the composition of the treated diluate output to increase hydrocarbon recovery from the hydrocarbon reservoir.

In additional cases, the temperature of the treated diluate output is changed before injecting the treated diluate output into the hydrocarbon reservoir to increase hydrocarbon recovery from the hydrocarbon reservoir.

The first stream of the aqueous solution can flow through the upstream nanofiltration system, wherein the concentrate output of the nanofiltration system is a retentate of the nanofiltration system, and wherein the diluate output of the nanofiltration system is a filtrate of the nanofiltration system. Either the filtrate or the retentate of the nanofiltration system is mixed with the second stream of the aqueous solution to produce the feed stream.

In particular exemplifications, the first stream of the aqueous solution flows through the upstream desalination system, and the upstream desalination system can comprise a reverse-osmosis system, wherein the concentrate output of the reverse-osmosis system is a retentate of the reverse-osmosis system, wherein the diluate output of the reverse-osmosis system is a permeate of the reverse-osmosis system, and wherein the permeate of the reverse-osmosis system is mixed with the second stream of the aqueous solution to produce the feed stream.

In additional exemplifications, the hydrocarbon that is extracted is oil, and the hydrocarbon reservoir is a carbonate reservoir. In particular exemplifications, the method can be performed on an offshore oil platform. In various embodiments, the hydrocarbon reservoir can be drilled well or tar sands.

The sodium chloride ratio of the treated diluate stream can be less than 0.55 or even less than 0.45.

In additional exemplifications, a brine stream from an output of the concentrate channels flows into a crystallizer or evaporator to produce a salt output.

Electrically driven separation apparatus with monovalent selective electrodialysis (MSED) membranes, as described herein can be used to treat source water to tailor the ion content of the source water for pumping into oil wells to increase the recovery of oil from the reservoir. The apparatus and methods, referred to herein as "electrically driven separation apparatus/systems" or as "MSED", can be used to treat and remove monovalent ions, such as sodium chloride, from source water (including but not limited to seawater) to inject into oil wells for enhancing the extraction of oil from the oil well.

The achievement of a low SCR via this invention can be advantageous in enhancing the efficiency of oil recovery because removing mono-valent sodium and chloride ions promotes water-rock wettability (while reducing the rock's oil-wettability) and maintenance of a stable water film on rock surfaces in an oil reservoir via the effects of multi-valent ions on surface charges at phase interfaces, wherein the stable water film and this surface-charge enhancement prevents polar components in the oil from adsorbing to rock surfaces. Removing the monovalent ions can also be beneficial because they may cause clay particles in the rock to swell or be stripped from pore walls. Furthermore, hybridizing of NF and the electrically driven separation system further reduces the presence of sulfate ions in injection water reducing the risk of hydrogen sulfide formation, reducing the potential for scale formation in the reservoir and extraction equipment, and enhancing the life of the reservoir, while cost-effectively achieving enhanced oil extraction through reduced monovalent ion concentrations.

Figure 1:
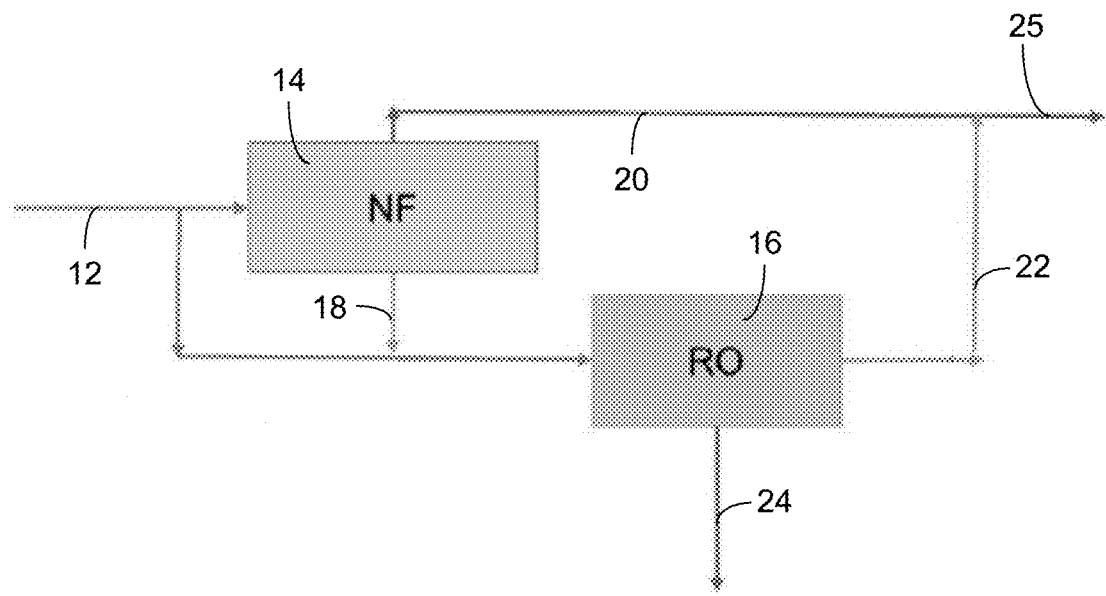
FIG. 1 shows the combination of a nano-filtration (NF) system 14 and a reverse-osmosis (RO) system 16 to produce monovalent-free seawater in a previous approach.

In the accompanying drawings, like reference characters refer to the same or similar parts throughout the different views; and apostrophes are used to differentiate multiple instances of the same item or different embodiments of items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. The term, "about," can mean within ±10% of the value recited. In addition, where a range of values is provided, each subrange and each individual value between the upper and lower ends of the range is contemplated and therefore disclosed.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as those introduced with the articles, "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

In accord with methods described herein, source water from the sea or the ground or produced water from an oil and gas well can be treated. The source water includes dissolved anions and cations and is fed to an electrically driven separation apparatus while a voltage is applied to an anode and a cathode on opposite sides of the electrically driven separation apparatus. The electrically driven separation apparatus further includes at least one monovalent selective cation exchange membrane and at least one monovalent selective anion exchange membrane between the anode and the cathode. The source water is passed through the electrically driven separation apparatus; and monovalent ions (i.e., cations and anions), such as sodium and chloride, are selectively removed from the drainage water through the monovalent selective ion exchange membranes; and the source water with the reduced amount of monovalent ions is sent to an oil and gas well to increase the extraction of oil from the oil and gas well.

The electrically driven separation apparatus can utilize an electrodialysis stack that combines conventional selective cation and anion electrodialysis (ED) membranes with monovalent selective cation and anion membranes, ion specific sensors, and a software control system. With these components, the electrically driven separation apparatus allows for removing sodium ions harmful for oil and gas extraction while retaining most of the beneficial ions, such as calcium ($Ca^{2+}$), magnesium ($Mg^{2+}$), carbonate ($CO_3^{2-}$) and sulfate ($SO_4^{2-}$).

Figure 4:
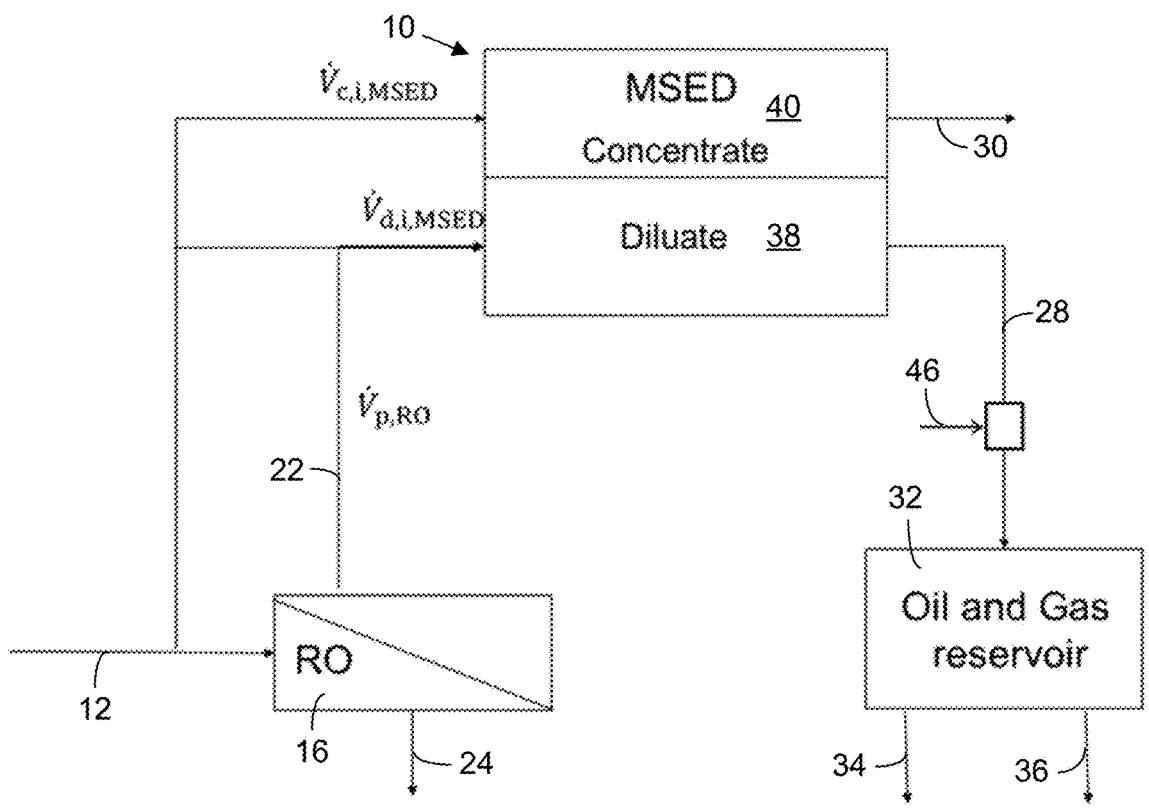
FIG. 4 is a schematic illustration showing electrically driven separation apparatus 10 coupled with a RO system 16 with chemical addition to enhance the recovery of oil from an oil and gas field 32.
Figure 6:
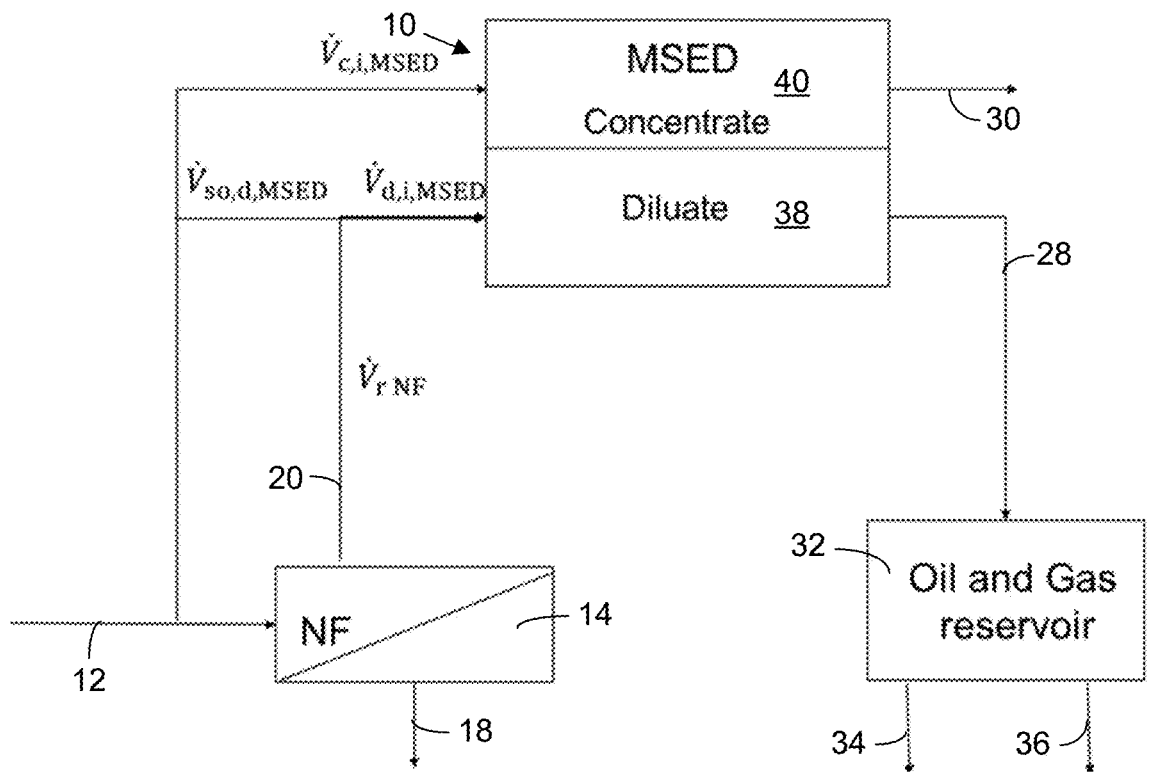
FIG. 6 is a schematic illustration showing an electrically driven separation apparatus 10 coupled with a NF system 14, where the retentate 20 from the NF system 14 is mixed with the source water 12 and fed through the diluate channel 38 of the MSED system 10, to enhance the recovery of oil from an oil and gas field 32.
Figure 12:
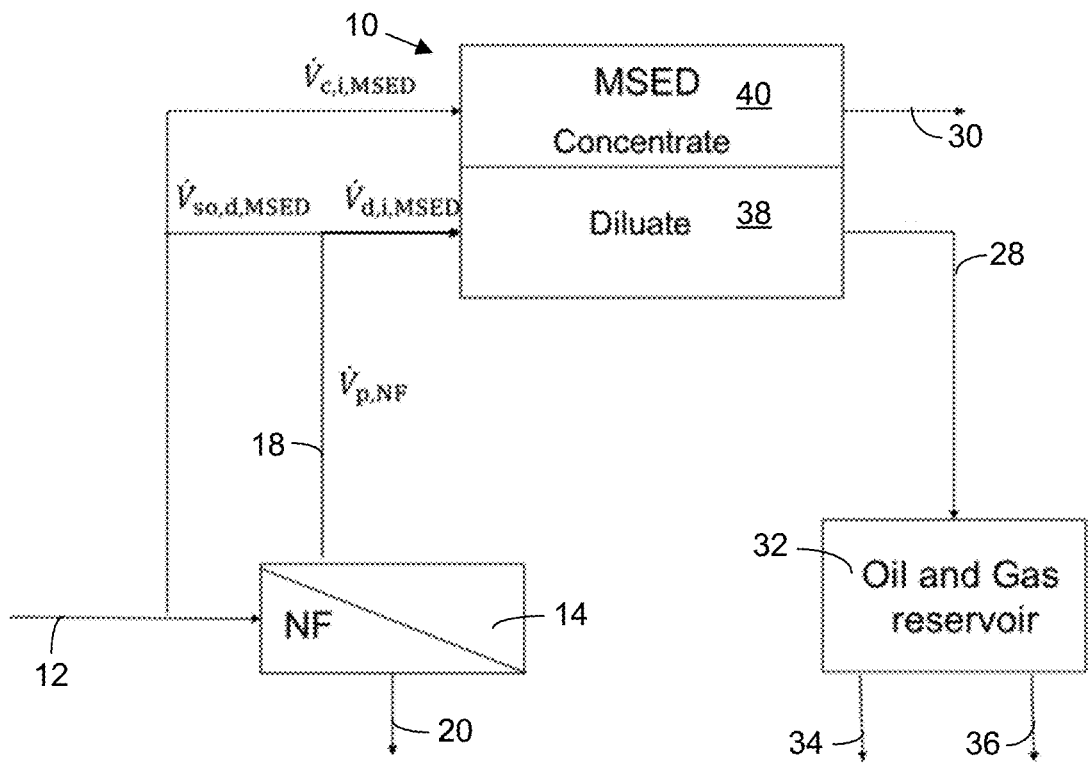
FIG. 12 is a schematic illustration showing a MSED system 10 coupled with a NF system 14, similar to the apparatus of FIG. 6, except the permeate 18 rather than the retentate 20 from the NF system 14 is mixed with the source water 12 and fed through the diluate channel 38 of the MSED system 10, to enhance the recovery of oil from an oil and gas field 32.

In particular exemplifications, seawater with a total dissolved solids (TDS) level in a range from 25,000-45,000 ppm is used as the source water. The electrically driven separation apparatus can be operated in batch, semi-batch or continuous mode, depending on operating conditions. In the process, source water entering the diluate channels of the electrically driven separation apparatus 10 can be mixed with pure product water 22 from a reverse-osmosis (RO) system, 16 as shown in FIG. 4, or with retentate 20 from a nanofiltration (NF) system 14, as shown in FIG. 6, or, in some cases, permeate 18 from a NF system 14, as shown in FIG. 12. This misxing can achieve sulfate reduction and monovalent-ion reduction. In some fields, using a low sulfate concentration is advantageous to avoid generating toxic hydrogen-sulfide gas.

In particular exemplifications, a temperature-changing system, such as a heat-exchanger, chiller or boiler, is positioned downstream from the electrically driven separation apparatus.

Further still, a pressure-driven separation apparatus, such as an apparatus for reverse osmosis or nanofiltration, can be used for pretreatment or post-treatment of the source water upstream or downstream from the electrically driven separation apparatus to further tailor the water stream.

Additionally, adjustments can be made to $Ca^{2+}$ and/or $Mg^{2+}$ and/or $CO_3^{2-}$ and/or $SO_4^{2-}$ concentration levels, by methods such as, but not limited to, pressure-driven separation and then mixing, addition of salts, and precipitation using lime. Increases in concentrations of $Ca^{2+}$, $Mg^{2+}$ and $SO_4^{2-}$ in water injected into carbonate reservoirs have been shown to lead to wettability changes increasing the recovery of oil. Adequate presence of $CO_3^{2-}$ ions in the injection water mimics the composition of formation water and can enhance the life of a carboante reservoir. The concentration of $SO_4^{2-}$, however, cannot be greater than a certain amount due to increased risk of formation of hydrogen sulfide and souring of the oil. The relative composition of these ions also is affected by the type of reservoir. The sum of these ions along with sodium and chloride ions is also relevant, depending on the type of reservoir. For enhancing oil recovery, carbonate reservoirs typically need injection water with a salinity near seawater (~35,000 ppm), while sandstone reservoirs typically need injection water with a salinity near brackish water (~5000 ppm). Additionally, surfactants and polymers can be added to the water to enhance the recovery of oil.

Further still, ion-specific sensors and a controller with software instructions stored on a computer-readable medium for processing readings from the sensors and adjusting operating parameters in response thereto can be included in the apparatus.

Figure 2:
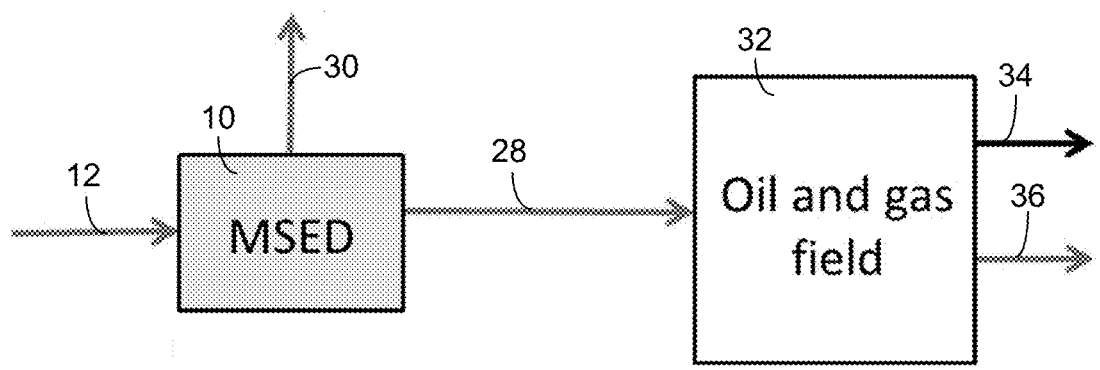
FIG. 2 is a schematic illustration showing an electrically driven separation apparatus 10 [a monovalent selective electrodialysis (MSED) system] coupled with an oil and gas field 32 to increase the recovery of oil therefrom.

A generic flow configuration of an electrically driven separation apparatus 10 for providing treated diluate water 28 for oil and gas production is shown in FIG. 2. Source water 12 that may be, but is not limited to, seawater, brackish groundwater or oil-and-gas produced water, flows into the electrically driven separation apparatus 10 (also referred to as a MSED system) which produces a treated diluate water 28 that is injected in to an oil and gas reservoir 32, producing oil 34 and produced water 36 as an output. The electrically driven separation apparatus 10 reduces the content of sodium chloride in the source water 12 to a sodium chloride ratio (SCR) less than 0.70, where SCR is defined as:

$$SCR = \frac{[NaCl]}{TDS},$$

where [NaCl] is the ratio of the concentration of sodium chloride in g/kg to the total dissolved solids (TDS) in g/kg in an aqueous solution.

Figure 9:
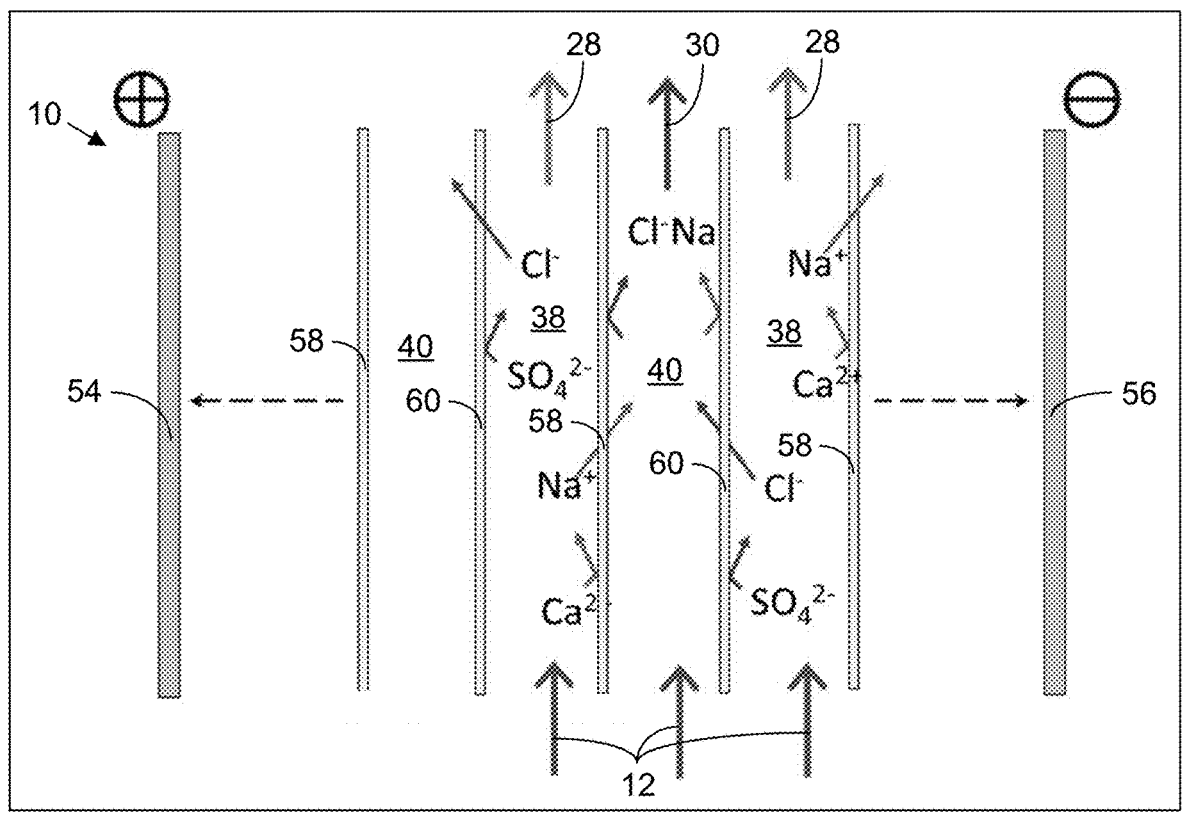
FIG. 9 shows the interior of a MSED system 10, including an anode 54 and a cathode 56, and the flow of ions across diluate and concentrate channels 38 and 40 through monovalent-selective cation-exchange membranes 58 and monovalent-selective anion-exchange membranes 60.

The interior of an MSED system 10 is shown in FIG. 9, where the source water is shown flowing into diluate channels 38 and concentrate channels 40 alternating in sequence (with additional repetitions of the parallel sequence of channels not shown between the anode 54 and cathode 56). Monovalent anions, such as $Cl^-$, pass from the diluate channels 38 through monovalent-selective anion-exchange membranes 60 into concentrate channels 40, while monovalent cations, such as $Na^+$, pass from the diluate channels 38 through monovalent-selective cation-exchange membranes 58 into the concentrate channels 40. The ion exchange between channels 38 and 40 produces a concentrated discharge 30 and treated diluate water 28 from the MSED system 10.

The monovalent-selective cation-exchange membranes 58 can have a permselectivity for $Na^+$ versus $Ca^{2+}$, $$P_{Na^+-Ca^{2+}} = \frac{J_{Na^+}/[Na^+]}{J_{Ca^{2+}}/[Ca^{2+}]} > 1.95,$$

where J refers to the flux of the ions across the membrane in mol/Lm², and where the concentrations of the ions are expressed in mol/L. An example of such a membrane is the NEOSEPTA CMS membrane, available from Eurodia Industrie SA (France).

Figure 3:
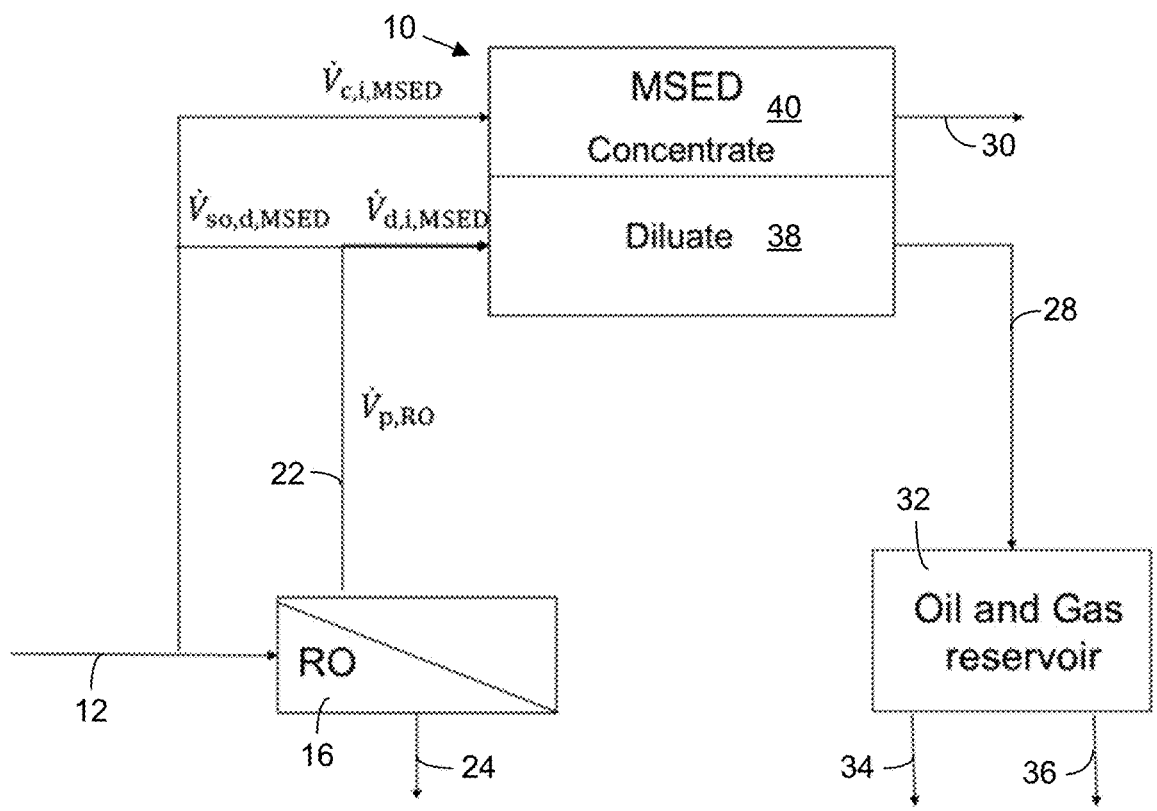
FIG. 3 is a schematic illustration showing an electrically driven separation apparatus 10 coupled with a RO system 16 to enhance the recovery of oil from an oil and gas field 32.

An electrically driven separation apparatus 10 coupled with a RO system 16 is shown in FIG. 3. Here, permeate (diluate) 22 from the RO system 16 is mixed with the source water 12 to produce a diluate stream 38 such that the source water/diluate ratio (SDR) is:

$$SDR = \frac{\dot{V}_{so,d,MSED}}{\dot{V}_{d,i,MSED}},$$

where $\dot{V}_{so,d,MSED}$ is the volume flow rate of source water (so) directed to the diluate channel (d) of the MSED system and $\dot{V}_{d,i,MSED}$ is the total combined flow rate of water flowing into the inlet of the diluate channel (d,i) of the MSED system, and where the system is configured such that the SDR is less than 0.47 or greater than 0.63.

Figure 10:
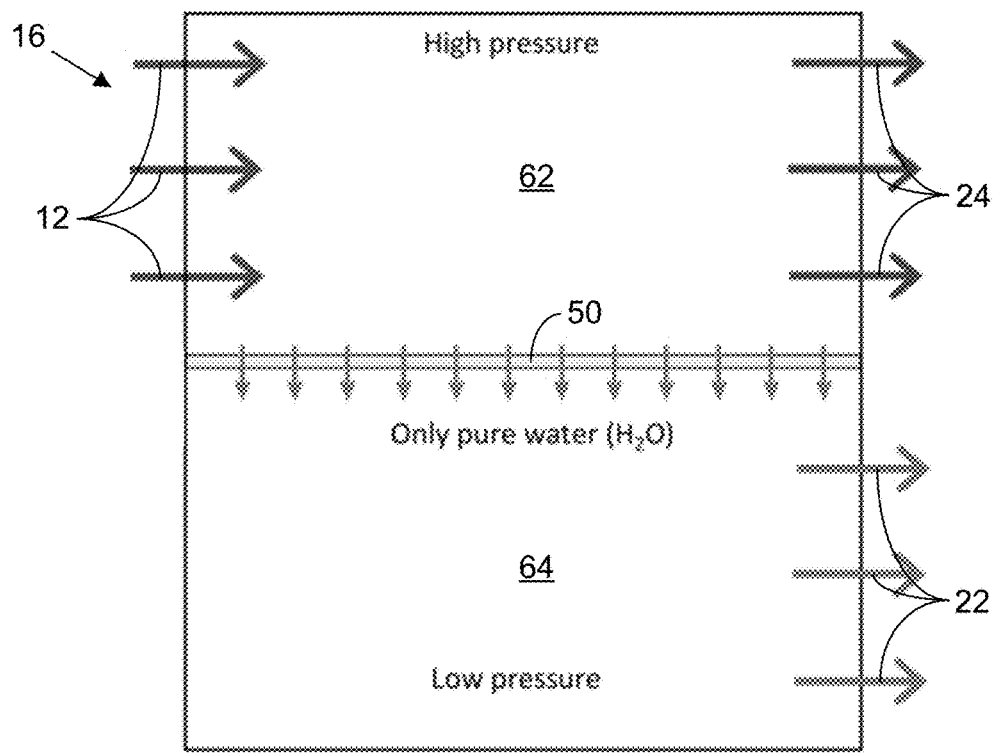
FIG. 10 shows the interior of a RO system 16, where high pressure on a retentate side 62 of the RO chamber forces pure water through a RO membrane to a permeate side 64 of the RO chamber, leaving other feed constituents in a discharged brine 34.

The treated diluate water 28 from the MSED system 10 is injected into an oil and/or gas reservoir. The interior of a RO system 16 is shown in FIG. 10, where the source water 12, which includes $Na^+$, $Cl^-$, $Ca^{2+}$, and $SO_4^{2-}$ dissolved in water, flows into a retentate side 62 of the RO chamber, and only pure water ($H_2O$) passes through the RO membrane 50 to the permeate side 64 of the RO chamber, while a retentate brine 24 is discharged from the retentate side 62 of the RO chamber.

The MSED system 10 also produces a concentrated brine 30 in the configuration of FIG. 3, and produced water 36 is output along with the oil and/or gas 34 from the oil/gas reservoir 32. The retentate brine 24, concentrated brine 30, and produced water 36 are all discharged from the system.

Figure 5:
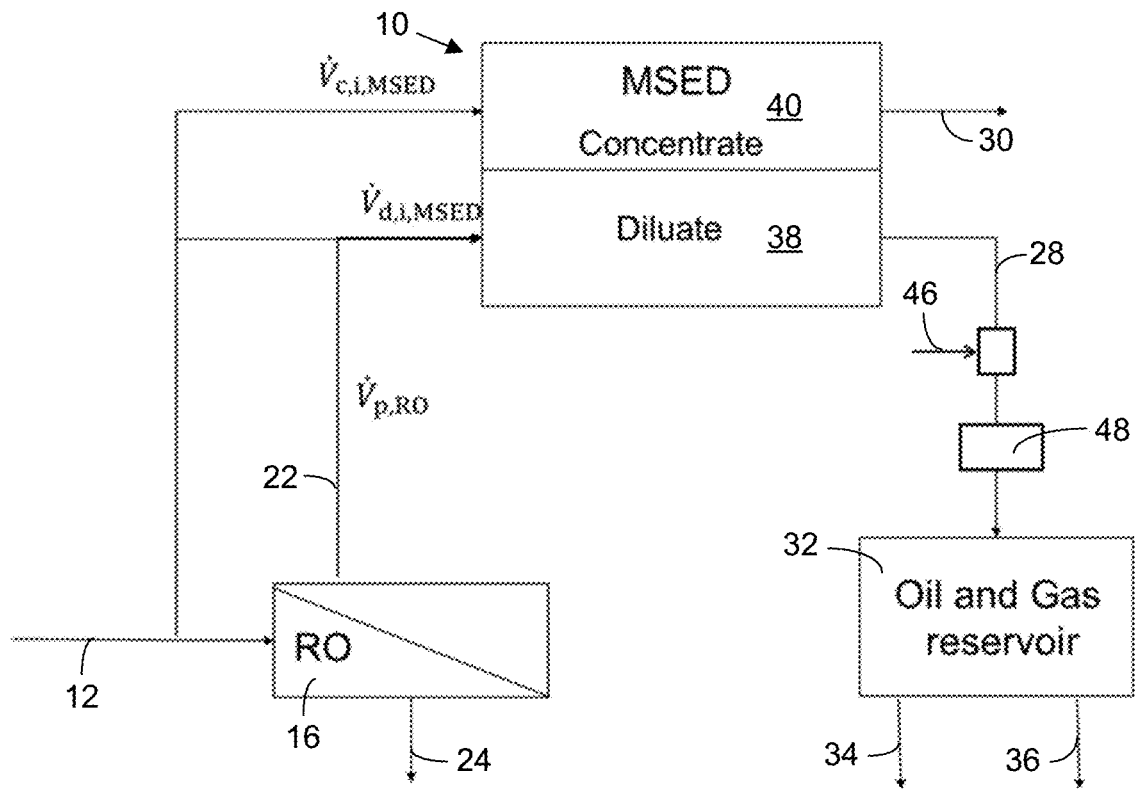
FIG. 5 is a schematic illustration showing electrically driven separation apparatus 10 coupled with a RO system 16 with chemical addition 46 and temperature adjustment 48 to enhance the recovery of oil from an oil and gas field 32.

The addition of chemicals 46 to treated diluate water 28 from an electrically driven separation apparatus 10 is shown in FIG. 4, while the adjustment of the temperature of the diluate water 28 (e.g., pre-heating the diluate water 28 with a heating device 48, where the oil is heavy and thick, to lower its viscosity) is shown in FIG. 5.

Chemicals 46 that can be added for oil and gas production can include (a) an acid (e.g., hydrochloric acid) for dissolving minerals and initiating cracks in rock; (b) a biocide (e.g., glutaraldehydehyde, quaternary ammonium chloride, or tetrakis hydromethyl-phosphonium sulfate) for eliminating bacteria; (c) a breaker (e.g., ammonium persulfate, sodium chloride, magnesium peroxide, magnesium oxide, or calcium chloride) that acts as a product stabilizer or that allows delayed break down of a gel; (d) a clay stabilizer (e.g., choline chloride, tetramethyl ammonium chloride, or sodium chloride); (e) a corrosion inhibitor (e.g., isopropanol, methanol, formic acid, acetaldehyde); (f) a crosslinker (e.g., petroleum distillate, potassium metaborate, triethanolamine zirconate, sodium tetraborate, boric acid, a zirconium complex, a borate salt, ethylene glycol, or methanol); (g) a friction reducer (e.g., polyacrylamide, petroleum distillate, methanol, or ethylene glycol); (h) a gelling agent (e.g., guar gum, petroleum distillate, methanol, a polysaccharide blend, or ethylene glycol); (i) an iron control agent (e.g., citric acid, acetic acid, thioglycolic acid, or sodium erythorbate) that prevents precipitation of metal oxides; (j) a non-emulsifier (e.g., lauryl sulfate, isopropanol, or ethylene glycol); (k) a pH-adjusting agent (e.g., sodium hydroxide, potassium hydroxide, acetic acid, sodium carbonate, or potassium carbonate); (l) a scale inhibitor (e.g., a copolymer of acrylamide and sodium acrylate, sodium polycarboxylate, or phosphonic acid salt); and/or a surfactant (e.g., lauryl sulfate, ethanol, naphthalene, methanol, isopropyl alcohol, or 2-butoxyethanol).

In another exemplification, the treated diluate water 28 can be injected into a lithium mineral reservoir to extract lithium rather than into a hydrocarbon reservoir 32.

Figure 11:
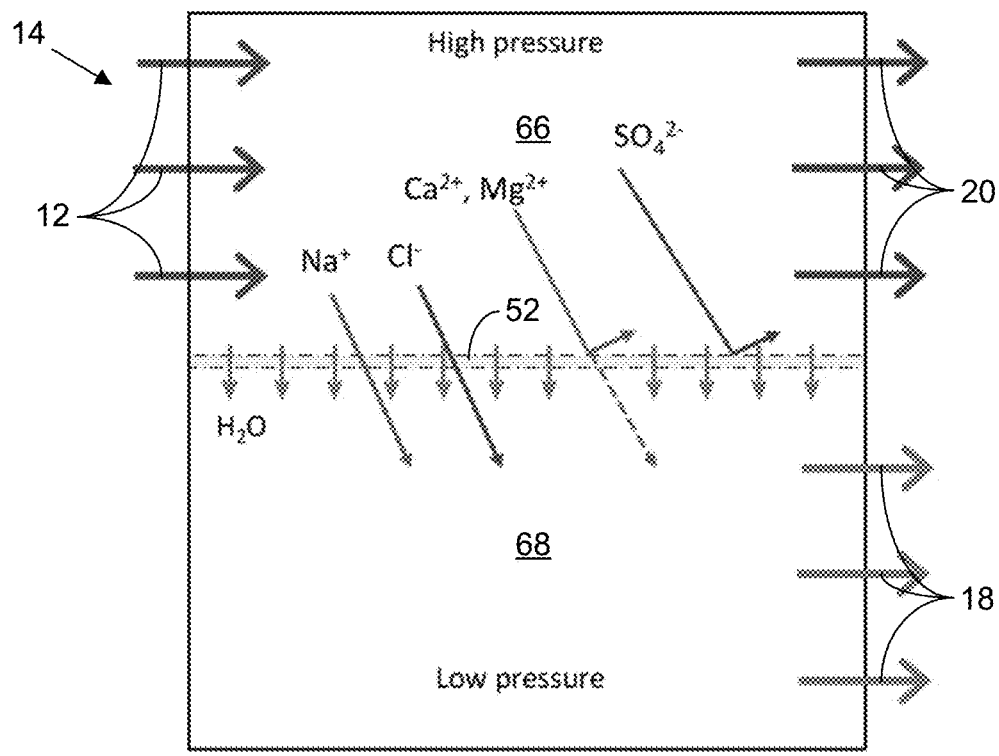
FIG. 11 shows the interior of a NF system 14, where high pressure on a retentate side 66 of the NF chamber forces a dilute permeate through a NF membrane 52 to a permeate side 68 of the NF chamber.

A configuration where, instead of permeate water 22 from a RO system 16, retentate 20 from a NF system 14 is mixed with source water 12 and delivered to the diluate channel 38 of the electrically driven separation apparatus 10 is shown in FIG. 6. The source water 12 includes $Na^+$, $Cl^-$, $Ca^{2+}$, $Mg^{2+}$, and $SO_4^{2-}$ dissolved in water. The interior of a NF system 14 is shown in FIG. 11, where smaller ions, such as $Na^+$ and $Cl^-$, pass with permeate from a high-pressure retentate side 66 through a nanofiltration membrane 52 to a lower-pressure permeate side 68 to generate a nanofiltration permeate 18 [with a dilute concentration of $SO_4^{2-}$ (very dilute), $Ca^{2+}$, and $Mg^{2+}$] from the permeate side 68 and a nanofiltration retentate 20 [with a high concentration of $SO_4^{2-}$ (very concentrated), $Ca^{2+}$, and $Mg^{2+}$] from the retentate side 66.

Figure 7:
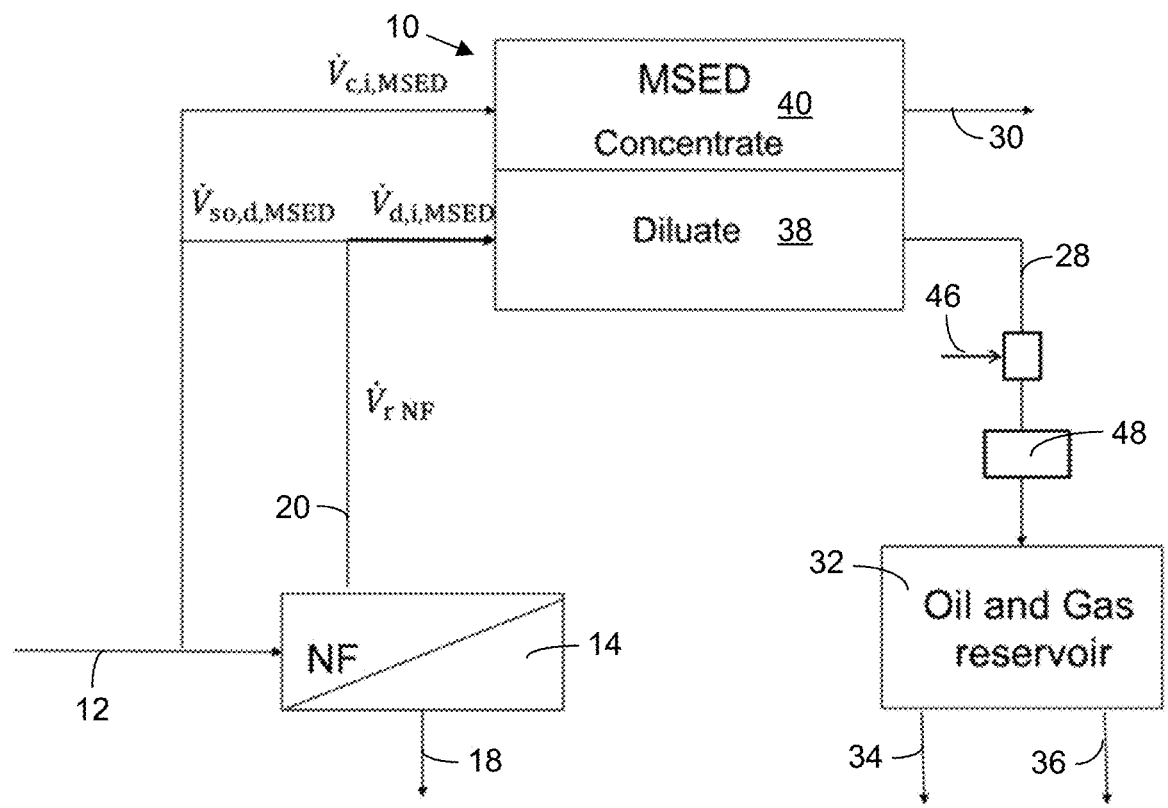
FIG. 7 is a schematic illustration showing an electrically driven separation apparatus 10 coupled with a NF system 14 along with chemical addition 46 and temperature adjustment 48 to enhance the recovery of oil from an oil and gas field 32.

FIG. 7 shows the addition of chemicals 46 and the adjustment of temperature 48 in the system of FIG. 6; either or both of these steps can be performed in any of the methods described herein.

Figure 8:
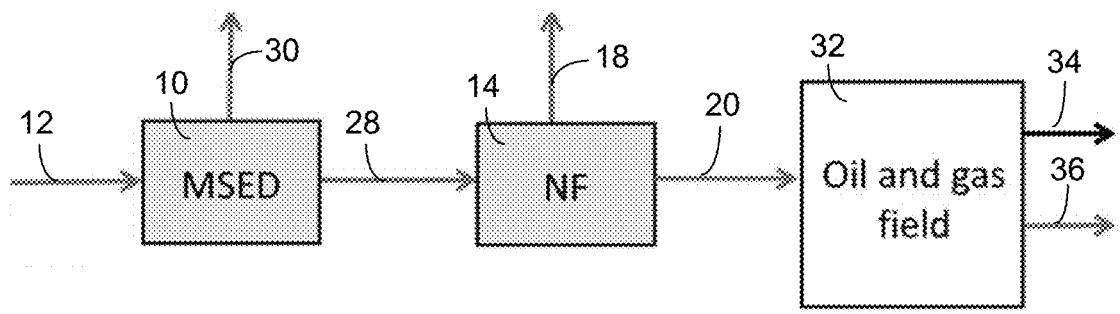
FIG. 8 is a schematic illustration showing an electrically driven separation apparatus 10 coupled with a NF post-treatment system 14 to enhance the recovery of oil from an oil and gas field 32.

A configuration where the treated diluate water 28 is post-treated using an NF system 14 is shown in FIG. 8.

In alternative embodiments, the method is carried out, as outlined above, except that, instead of using monovalent-selective ion exchange membranes, divalent-selective ion exchange membranes are used to separate ions that are trivalent, such as phosphates, from streams while passing mon- and di-valent ions.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof or within a range of the specified parameter up to or down to any of the variations specified above (e.g., for a specified parameter of 100 and a variation of $1/100^{th}$, the value of the parameter may be in a range from 0.99 to 1.01), unless otherwise specified. Moreover, while this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for enhancing recovery of hydrocarbons from a hydrocarbon reservoir using an upstream desalination system or nanofiltration system with an outlet in fluid communication with an electrically driven separation apparatus that includes an anode, a cathode, and a plurality of anionic and cationic monovalent-selective ion exchange membranes alternating in a repeating sequence between the anode and the cathode, wherein alternating diluate channels and concentrate channels are defined in a repeating sequence between the cationic and anionic monovalent-selective ion exchange membranes, the method comprising:

flowing a first stream of an aqueous solution comprising monovalent ions and multi-valent ions dissolved in water through the upstream desalination system or nanofiltration system;

obtaining a concentrate output and a diluate output from the upstream desalination system or nanofiltration system, wherein the concentrate output has a higher concentration of dissolved ions than does the diluate output;

mixing a second stream of the aqueous solution with the diluate output from the upstream desalination system or with the diluate or concentrate output from the upstream nanofiltration system to produce a feed stream such that the ratio of flow of the second stream of the aqueous solution to that of the feed stream is less than 0.47 or greater than 0.63;

flowing a liquid composition into inputs of the concentrate channels;

flowing the feed stream into an input of at least the diluate channels while applying a voltage to the anode and to the cathode, wherein the feed stream flows into the diluate channels at a ratio of 0.3 to 0.81 to flow of the liquid composition flowing into the concentrate channels, and wherein the applied voltage selectively draws the monovalent ions from the feed stream in the diluate channels through the monovalent-selective ion exchange membranes into the concentrate channels while blocking or substantially inhibiting transport of the multi-valent ions from the feed stream through the monovalent-selective ion exchange membranes into the concentrate channels, to produce a treated diluate stream at an output of the diluate channel having a sodium chloride ratio (SCR) less than 0.7, wherein the monovalent-selective cation exchange membranes have a permselectivity for Na$^+$ versus Ca$^+$, $$P_{Na^+-Ca^{2+}} = \frac{J_{Na^+}/[Na^+]}{J_{Ca^{2+}}/[Ca^{2+}]} > 1.95,$$

where J refers to flux of ions across the monovalent-selective cation-exchange membrane; and injecting the treated diluate stream into the hydrocarbon reservoir to extract hydrocarbons from the hydrocarbon reservoir.

2. The method of claim 1, wherein the liquid composition comprises a third stream of the aqueous solution.

3. The method of claim 1, wherein the liquid composition flowing into the concentrate channels has a composition distinct from the aqueous solution.

4. The method of claim 3, wherein the liquid composition flowing into the concentrate channels comprises produced water from oil extraction.

5. The method of claim 1, further comprising adding at least one of a surfactant and a salt to the treated diluate stream to change the composition of the treated diluate stream to increase hydrocarbon recovery from the hydrocarbon reservoir.

6. The method of claim 1, further comprising changing a temperature of the treated diluate stream before injecting the treated diluate stream into the hydrocarbon reservoir to increase hydrocarbon recovery from the hydrocarbon reservoir.

7. The method of claim 1, wherein the first stream of the aqueous solution flows through the upstream nanofiltration system, and wherein the concentrate output of the nanofiltration system is a retentate of the nanofiltration system, and wherein the diluate output of the nanofiltration system is a filtrate of the nanofiltration system.

8. The method of claim 7, wherein the filtrate of the nanofiltration system is mixed with the second stream of the aqueous solution to produce the feed stream.

9. The method of claim 7, wherein the retentate of the nanofiltration system is mixed with the second stream of the aqueous solution to produce the feed stream.

10. The method of claim 1, wherein the first stream of the aqueous solution flows through the upstream desalination system, and wherein the upstream desalination system comprises a reverse-osmosis system, wherein the concentrate output of the reverse-osmosis system is a retentate of the reverse-osmosis system, wherein the diluate output of the reverse-osmosis system is a permeate of the reverse-osmosis system, and wherein the permeate of the reverse-osmosis system is mixed with the second stream of the aqueous solution to produce the feed stream.

11. The method of claim 1, wherein the hydrocarbon extracted is oil, and wherein the hydrocarbon reservoir is a carbonate reservoir.

12. The method of claim 1, wherein the sodium chloride ratio of the treated diluate stream is less than 0.55.

13. The method of claim 1, wherein the method is performed on an offshore oil platform.

14. The method of claim 1, wherein the sodium chloride ratio of the treated diluate stream is less than 0.45.

15. The method of claim 1, further comprising flowing a brine stream from an output of the concentrate channels into a crystallizer or evaporator to produce a salt output.

16. A method for enhancing extraction of a resource from a reservoir using an upstream desalination system or nanofiltration system with an outlet in fluid communication with an electrically driven separation apparatus that includes an anode, a cathode, and a plurality of anionic and cationic valency-selective ion exchange membranes alternating in a repeating sequence between the anode and the cathode, wherein alternating diluate channels and concentrate channels are defined in a repeating sequence between the cationic and anionic valency-selective ion exchange membranes, the method comprising:

flowing a first stream of an aqueous solution comprising ions different valences dissolved in water through the upstream desalination system or nanofiltration system;

obtaining a concentrate output and a diluate output from the upstream desalination system or nanofiltration system, wherein the concentrate output has a higher concentration of dissolved ions than does the diluate output mixing a second stream of the aqueous solution with the diluate output from the upstream desalination system or with the diluate or concentrate output from the upstream nanofiltration system to produce a feed stream such that the ratio of flow of the second stream of the aqueous solution to that of the feed stream is less than 0.47 or greater than 0.63;

flowing a liquid composition into inputs of the concentrate channels;

flowing the feed stream into an input of at least the diluate channels while applying a voltage to the anode and to the cathode, wherein the feed stream flows into the diluate channels at a ratio of 0.3 to 0.81 to flow of the liquid composition flowing into the concentrate channels, and wherein the applied voltage selectively draws lower-valency ions from the feed stream in the diluate channels through the valency-selective ion exchange membranes into the concentrate channels while blocking or substantially inhibiting transport of higher-valency ions from the feed stream through the valency-selective ion exchange membranes into the concentrate channels, to produce a treated diluate stream at an output of the diluate channel having a sodium chloride ratio (SCR) less than 0.7, wherein the monovalent-selective cation exchange membranes have a permselectivity for $Na^+$ versus $Ca^+$, $$P_{Na^+-Ca^{2+}} = \frac{J_{Na^+}/[Na^+]}{J_{Ca^{2+}}/[Ca^{2+}]} > 1.95,$$

where J refers to flux of ions across the monovalent-selective cation-exchange membrane; and injecting the treated diluate stream into the reservoir to extract the resource from the reservoir.

17. The method of claim 16, wherein the resource comprises lithium.

* * * * *